Feb. 12, 1924.
H. A. CURRIE
1,483,284
CASTER
Filed Nov. 18, 1921
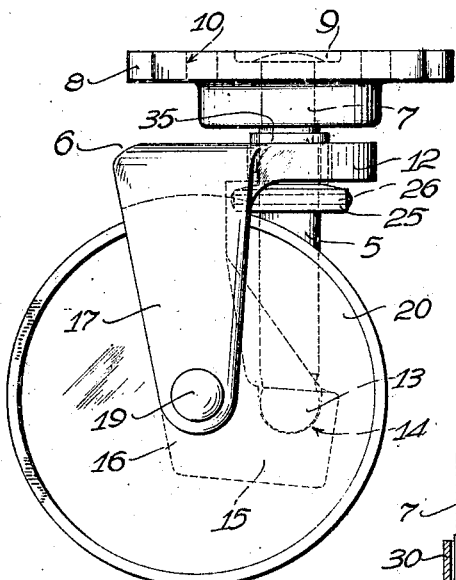
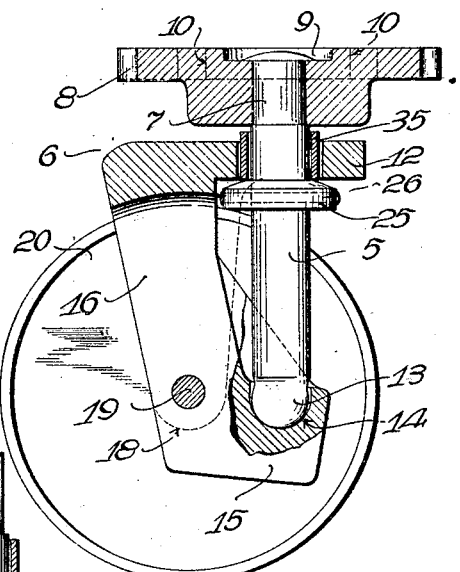
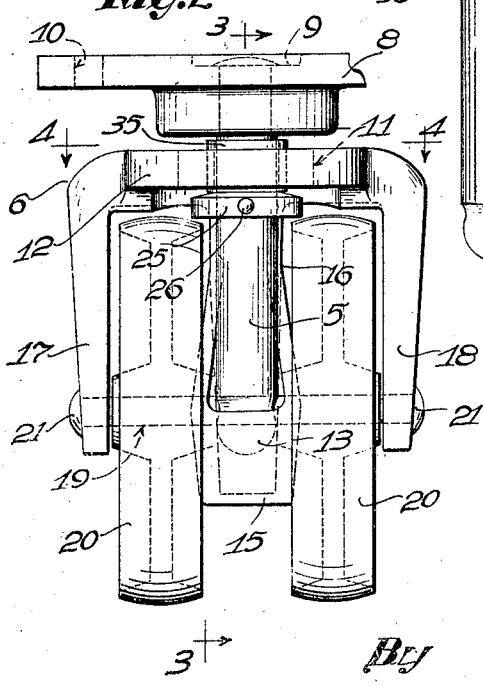
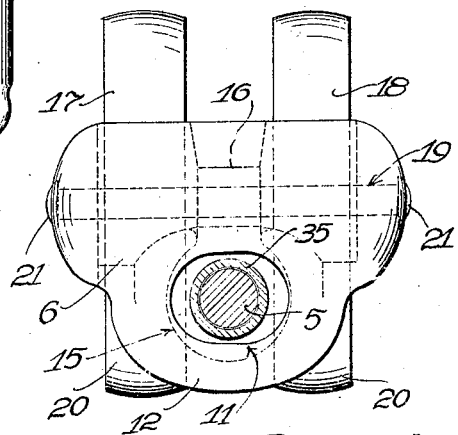
Inventor
Hugh A. Currie
Brown, Boettcher & Dienner
Attorneys Patented Feb. 12, 1924.

1,483,284

UNITED STATES PATENT OFFICE.

HUGH A. CURRIE, OF CHICAGO, ILLINOIS.

CASTER.

Application filed November 18, 1921. Serial No. 516,041.

*To all whom it may concern:*

Be it known that I, HUGH A. CURRIE, a citizen of the United States, residing at Chicago, in the county of Cook and State of Illinois, have invented a certain new and useful Improvement in Casters, of which the following is a full, clear, concise, and exact description, reference being had to the accompanying drawings, forming a part of this specification.

My invention relates to casters, and is concerned more particularly with casters for relatively heavy duty service, such as for example, facilitating the movement of portable warehouse trucks and the like.

It is an object of my invention to strengthen, enhance the durability, and otherwise improve the structure of devices of this sort. One of the provisions to this end is an improved arrangement for maintaining the proper vertical positioning of the wheel carrying frame or yoke.

A further object of my invention is the provision of a caster, in which assembling and dismantling is facilitated and disorganization of the parts when in use effectively prevented. To this end, an improved arrangement is provided for holding the wheel carrying frame or yoke against displacement from the stem upon which it is mounted to swivel.

A still further object of my invention is to improve the functioning of such devices.

Further objects and advantages of my invention will appear from the following detailed description and the claims, taken with an inspection of the accompanying drawings, in which:

Figure 1 is a side elevational view of a caster embodying my invention;

Figure 2 is a front elevational view of the same;

Figure 3 is a vertical sectional view taken substantially on the line 3—3 of Figure 2;

Figure 4 is a horizontal sectional view taken on the line 4—4 of Figure 2; and

Figure 5 is an enlarged elevational view of the stem, upon which the wheel carrying frame or yoke is mounted to swivel, showing an alternative arrangement for holding the frame or yoke against displacement.

In the particular embodiment of the invention selected for illustration the vertical stem or post 5 upon which the wheel carrying frame or yoke 6 is mounted to swivel, is provided with a reduced upper end 7 which extends through a mounting plate 8 and is firmly secured therein, as by riveting or heading over the upper end in a recess 9 in the upper surface of the plate. The plate 8 is provided with openings 10 through which screws may be inserted to secure the caster to a truck or other load to be carried by the caster. An upwardly projecting stem or prolongation of the stem 5 may be provided to enter a socket in the base of the device to which the caster is to be secured in lieu of the openings 10 if so desired, especially where a comparatively small caster embodying the principles of the present invention is employed.

The stem or post 5 extends downwardly through an elongated opening 11 in a forwardly projecting flange 12 at the upper end of the wheel carrying frame or yoke 6 and terminates at its lower end in a convex head 13. The headed end 13 of the stem or post 5 bears in an upwardly opening concave bearing socket 14 formed in the forwardly projecting portion 15 of an arm 16 depending from the yoke member 6 between its opposite ends. The opposite ends of the upper portion of the frame or yoke 6 terminate in depending yoke or axle carrying arms 17 and 18 respectively, which arms are provided at their lower ends with alinged openings in which the opposite ends of the axle 19 are carried.

The axle 19 extends through the hubs of the wheels or rollers 20—20 arranged between the arms 17—16 and 16—18 respectively. The particular wheels or rollers shown have suitable hubs from which disc-like webs extend radially and terminate in suitable floor or ground engaging rims. The details of the wheels or rollers, per se, are immaterial in so far as the essence of the present invention is concerned. They may be varied for use under various conditions of service. The axle 19 is secured against displacement as by heading over the opposite ends thereof as shown at 21—21.

A collar 25 secured upon the stem or post 5 adjacent the under surface of the forwardly projecting flange 12 at the upper end of the wheel carrying frame or yoke 6 cooperates with said flange 12 to prevent vertical displacement of the wheel carrying frame from the stem or post 5. The collar 25 may be secured in place by means of a pin 26 inserted transversely through it and the stem 5 and headed or riveted over at its opposite ends as shown in Figs. 1, 2 and 3, or it may be secured in place by means of an annular steel wire or spring ring 28 cut apart within its circumference and adapted to be sprung into place in cooperating circumferental grooves 29 and 30 in the stem 5 and about the lower end of the axial opening through the collar 25 respectively. In making up the device, where the groove and co-operating annular spring arrangement is to be employed the wheel carrying frame is arranged in its proper position upon the stem and the stem then marked and grooved. When it is desired to dismantle the caster, all that is necessary is to remove the pin 26 or spring the spring ring 28 from the grooves 29 and 30 as the case may be. Removal of the pin 26 may be conveniently had by filing or grinding off, for example, one of the headed ends thereof. In certain prior art devices with which I am familiar it is necessary to remove the wheels and axle in dismantling the caster. This is avoided in the device of my invention. In assembling the caster of my invention the wheel carrying frame is quickly, conveniently and positively secured against displacement. The upper surface of the collar 25 is convex or spherical about the center of the head 13 of the stem 5 to permit the frame or yoke 6 to tilt freely about the stem 5 in the plane of the elongated opening 11 through the flange 12.

A sleeve 35 encircles that portion of the stem 5 which extends through the opening 11. I find that a seamless case-hardened tube for this purpose will admirably withstand any wear to which it might be subjected by reason of its movement through the slot 11 upon tilting of the frame 6 about the stem 5.

The proper vertical positioning of the wheel carrying frame 6 with respect to the stem 5 is maintained by the encircling flange 12. The strength, durability and effectiveness of such an arrangement are obvious. The weak projecting lugs used in the prior art for maintaining the proper vertical position of the wheel frame are avoided. Furthermore, the necessity of cutting away the upper portion of the wheel carrying frame to receive a collar box, roller or the like, on the vertical post or stem is avoided and the strength and durability of the frame is increased.

In use the wheel carrying frame 6 swivels freely and easily about the vertical post or stem 5 permitting free and easy manipulation and turning of the load carried by the caster. Tilting of the wheel carrying frame about the stem 5 in the plane of the elongated opening 11 works hand in hand with the free and easy swiveling permitted about the stem to permit free and easy manipulation of the load over rough and irregular surfaces without difficulty. There are no parts which are liable to be easily broken nor are there any parts which will interfere with the free and easy action of the device.

While I have described my invention in connection with the details of a particular embodiment, I do not intend thereby to limit the invention to such details, as I am aware and contemplate that modifications and changes may be made to adapt the invention for use under various conditions of service without departing from the essential aspects of the invention which are set out in the appended claims. For example, while I have shown the invention as embodied in a double wheeled caster, it is clear that the invention may be embodied in various other forms of casters and the appended claims are therefore drawn accordingly.

I claim:

1. In a caster of the class described, a stem, a wheel carrying frame mounted thereupon, a collar removably mounted upon the stem and cooperable with the frame to hold the same against displacement and means engageable with the stem and said collar to hold the collar in place upon the stem.

2. In a caster of the class described, an upright post, a wheel frame mounted to swivel on said post, said frame having a bearing socket for the lower end of the post and a projecting arm, said arm having an elongated opening the lesser dimension of which is greater than the diameter of that portion of the post extending therethrough to provide sufficient clearance entirely about the post for the reception of a bearing sleeve, a bearing sleeve encircling that portion of the post extending through said opening, a collar removably mounted upon the post and extending radially beneath said sleeve and across the clearance about the post to a point beneath the projecting arm of the wheel frame, said collar and the upright post having circumferential grooves and an annular spring ring engageable in said grooves to hold the collar in place upon the post.

3. In a caster of the class described, an upright post, a wheel frame mounted to swivel on said post, said frame having a bearing socket for the lower end of the post and a projecting arm, said arm having an elongated opening the lesser dimension of which is greater than the diameter of that portion of the post extending therethrough to provide sufficient clearance entirely about the post for the reception of a bearing sleeve, a bearing sleeve encircling that portion of the post extending through said opening, a collar removably mounted upon the post and extending radially beneath said sleeve and across the clearance around the post to a point beneath the projecting arm of the wheel frame, and means engageable with the post and said collar to hold the collar in place on the post.

4. In a caster of the class described, an upright post, a wheel frame mounted to swivel on said post, said frame having a bearing socket for the lower end of the post and a projecting arm, said arm having an elongated opening the lesser dimension of which is greater than the diameter of that portion of the post extending therethrough to provide sufficient clearance entirely about the post for the reception of a bearing sleeve, a bearing sleeve encircling that portion of the post extending through said opening, and a collar removably mounted on the post, said collar having a convex surface extending radially beneath said sleeve and across the clearance around the post to a point beneath the projecting arm of the wheel frame.

5. In a caster of the class described, a post, a wheel carrying frame mounted thereupon, a collar removably mounted upon the post and cooperable with the frame to hold the same against displacement, said collar and the post having circumferential grooves and an annular spring ring engageable in said grooves to hold the collar in place upon the post.

6. In a caster of the class described, a stem, a frame having a bearing for the stem and an opening through which the stem is adapted to project, a bearing sleeve arranged upon the portion of the stem extending through said opening, a collar mounted upon the stem and cooperable with the frame and said bearing sleeve to hold the frame and sleeve against displacement and means engageable with the stem and said collar to hold the collar in place upon the stem.

In witness whereof, I hereunto subscribe my name this 15 day of November, 1921.

HUGH A. CURRIE.